United States Patent
Rozsa et al.

(10) Patent No.: US 7,138,633 B1
(45) Date of Patent: Nov. 21, 2006

(54) APPARATUS EMPLOYING A FILTERED SCINTILLATOR AND METHOD OF USING SAME

(75) Inventors: Csaba M. Rozsa, Brecksville, OH (US); George A. Mataraza, Euclid, OH (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 313 days.

(21) Appl. No.: 10/764,342

(22) Filed: Jan. 23, 2004

(51) Int. Cl.
*G01T 1/20* (2006.01)

(52) U.S. Cl. .................................. 250/368; 250/361 R
(58) Field of Classification Search ................ 250/368, 250/361 R
See application file for complete search history.

(56) References Cited

U.S. PATENT DOCUMENTS

| | | | | |
|---|---|---|---|---|
| 3,892,971 A | * | 7/1975 | Arthur et al. ........... | 250/361 R |
| 3,996,461 A | * | 12/1976 | Sulzbach et al. ....... | 250/214 R |
| 5,087,818 A | * | 2/1992 | Bellian et al. .......... | 250/361 R |
| 6,359,282 B1 | * | 3/2002 | Sekela .................... | 250/370.11 |
| 2002/0070365 A1 | * | 6/2002 | Karellas .................... | 250/581 |
| 2002/0195565 A1 | * | 12/2002 | Lecoq .................... | 250/363.03 |

FOREIGN PATENT DOCUMENTS

JP        55065176 A   *   5/1980

* cited by examiner

*Primary Examiner*—David Porta
*Assistant Examiner*—David S. Baker
(74) *Attorney, Agent, or Firm*—Lowrie, Lando & Anastasi, LLP (57) ABSTRACT

A scintillation detector apparatus comprising a filter disposed intermediate a scintillator and a detector, the filter being adapted to block relatively long wavelengths of light to reduce afterglow. The detector apparatus may, for example, be a part of a detector system such as a CT scanner, a RG system, or a geophysical measurement system.

64 Claims, 8 Drawing Sheets

APPARATUS EMPLOYING A FILTERED SCINTILLATOR AND METHOD OF USING SAME

BACKGROUND OF INVENTION

1. Field of Invention

The present invention is directed to scintillation systems and, more particularly, to scintillation systems comprising a filtered scintillator.

2. Discussion of Related Art

The use of scintillators in radiation detection apparatus is well known. Typically, in such detection apparatus, radiation that is not easily detected by conventional photodetectors is projected onto a scintillator. The scintillator absorbs the radiation (also referred to herein as "excitatory radition") and, in response, the scintillator emits scintillation light (also referred to herein simply as "light") in a wavelength band that is more conveniently detected by a conventional photodetector. For example, scintillators are used to detect high-energy radiation (e.g., x-rays, gamma rays, alpha particles, beta particles) by absorbing the radiation, and emitting infrared light or visible light in response to the radiation. The term "radiation" is defined herein to include electromagnetic radiation or particles. The term "light" is defined herein to include electromagnetic radiation of any wavelength, and is not limited to visible light. The term "scintillator" is defined herein as a phosphorescent material that emits light in response to excitatory radiation incident thereon.

Scintillation-based detector apparatus have found uses in many fields of applications. For example, such detector apparatus are conventionally used in geophysical applications (e.g., mining), radio gauging (RG) applications and computer tomography (CT) applications.

SUMMARY OF INVENTION

Aspects of the present invention are directed to reducing the effects of a characteristic of scintillators commonly referred to as afterglow. Afterglow refers to an emission of light from a scintillator that occurs a substantial period of time after excitatory radiation is incident thereon.

For convenience, herein below, the term "excitatory radiation" (or simply radiation) will be used to refer to electromagnetic radiation or particles that are input into a scintillator, and the term "scintillation light" (or simply "light") will be used to refer to electromagnetic radiation that is output from the scintillator in response to the input of radiation. However, the use of the term "radiation" to refer to that which is input to a scintillator, and the use of the term "light" to refer to that which is output from a scintillator is merely for clarity of description. No further limitation should be read into the use of these terms in such a manner, beyond that which is presented by the definitions above. It is to be appreciated that according to these definitions there is considerable overlap in the wavelengths that may be described as radiation and light.

A first aspect of the invention is directed to an apparatus, comprising: a scintillator; a photodetector optically coupled to the scintillator; and a filter operatively disposed intermediate the scintillator and the photodetector, being adapted to selectively reduce scintillator light having relatively long wavelengths. In some embodiments, the scintillator is comprised of a material selected from the group consisting of CsI, CsI(Tl), CsI(Na), $CdWO_4$ and $BaF_2$. The filter may be comprised of a blue additive dichroic filter. In some embodiments, the scintillator is comprised of a cyan subtractive dichroic filter.

The filter may be mechanically coupled to at least one of the scintillator and the photodetector. In some embodiments, the filter is disposed in a housing. In some embodiments, the filter is disposed in a first housing component and the photodetector is disposed in a second housing component, the first housing component and the second housing component being coupled together. Optionally, the filter is attached to at least one of the scintillator and the photodetector. The filter may be attached by an adhesive to at least one of the scintillator and the photodetector. In some embodiments, the adhesive is comprised of one of a silicone and an epoxy. The photodetector and the scintillator may be optically coupled through the adhesive. In some embodiments, the filter is a coating disposed on one of the photodetector and the scintillator. The photodetector may comprise a casing and the filter may be disposed on the casing.

The filter may be one of a dichroic filter, a colored glass filter and an interference filter. The filter may comprise at least one of a high pass filter, a notch filter and a bandpass filter. In some embodiments, the photodetector comprises one of a photodiode and a photomultiplier tube. In some embodiments, the relatively long wavelengths comprise wavelengths of scintillation light from the scintillator that produce less than 10% of the intensity that the wavelength of maximum intensity ($\lambda_{peak}$) produces. In other embodiments, the relatively long wavelengths comprise wavelengths of scintillation light from the scintillator that produce less than 5% of the intensity that the wavelength of maximum intensity ($\lambda_{peak}$) produces.

Another aspect of the invention is directed to a filter adapted to selectively reduce light having relatively long wavelengths, and constructed and arranged to be operatively disposed intermediate a scintillator and a photodetector.

Another aspect of the invention is directed to a method of detecting radiation, comprising: projecting radiation onto a scintillator to produce scintillation light; selectively reducing a portion of the scintillation light having relatively long wavelengths; and detecting the scintillation light.

Yet another aspect of the invention is directed to a method of facilitating radiation detection, comprising: providing a filter constructed and arranged to selectively reduce light emitted by the scintillator having relatively long wavelengths, and positioning the filter in a location to receive light from the scintillator.

Still another aspect of the invention is directed to an apparatus for use with a photodetector, comprising: a scintillator; a filter adapted to selectively reduce scintillation light having relatively long wavelengths; and a structure configured to maintain the scintillator and the filter, the structure being adapted to couple to a photodetector such that the filter is operatively disposed intermediate the scintillator and the photodetector.

Another aspect of the invention is directed to a scintillator system, comprising: a radiation source; a scintillator optically coupled to receive radiation from the radiation source; a photodetector optically coupled to receive scintillation light from the scintillator; a filter operatively disposed intermediate the scintillator and the photodetector and adapted to selectively reduce scintillator light having relatively long wavelengths.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Afterglow may be understood as follows. Excitatory radiation incident on a scintillator results in excitation of electrons in the scintillator (i.e., transitions of the electrons from low energy states to high energy states). The electrons subsequent transition from the high energy states back to low energy states results in an output of light (i.e., scintillation light). However, the transitions of electrons from high energy states to low energy states occur at differing decay rates. Some such transitions occur nearly instantaneously after application of the radiation, and other transitions occur substantial periods of time after application of the radiation. Afterglow arises from light emitted from a scintillator as a result of transitions of electrons from excited states to low energy states substantial periods of time after application of the radiation.

In scintillation-based detector apparatus, as a result of afterglow, scintillation light produced in response to radiation is projected onto a photodetector a substantial period of time after corresponding excitatory radiation was incident on the scintillator. Accordingly, the electrical output from a photodetector that results from afterglow also occurs a substantial period of time after the excitatory radiation was incident on the scintillator. As a result of afterglow, artifacts that are deleterious to measurements made by the detector apparatus may occur. Manifestations of such artifacts are dependent on the measurements being made by a detector apparatus. For example, in RG applications, a dimension being measured may be rendered inaccurate; and in CT applications, an image of a body being imaged may have what is commonly referred to as "ghosting."

Aspects of the present invention apply a recognition that transitions of excited electrons from high energy states back to low energy states that have relatively long decay rates (i.e., those transitions resulting in afterglow) correspond to transitions of a relatively small energies (i.e., those that result in the emission of light having a relatively long wavelength). Accordingly, in some embodiments of scintillator-based detector apparatus according to aspects of the invention, a filter is used to reduce or eliminate scintillation light having relatively long wavelengths from reaching a photodetector. By filtering scintillation light corresponding to the longer decay rates, the light incident on the photodetector, and the corresponding electrical output from the photodetector are less affected by afterglow.

Afterglow performance of a scintillator can be characterized by determining the scintillator's response to a pulse of radiation. For example, afterglow is sometimes used to refer to light emitted by a scintillator in response to a pulse of radiation, that occurs after the light output is reduced to a fraction equal to 1/e of a peak light output (i.e., the output is reduced by approximately 67%). However, the term "afterglow" is defined herein to mean any scintillation light emitted a period of time after corresponding excitatory radiation is incident upon a scintillator, so as to negatively affect a measurement to be made using the scintillator.

Relatively long wavelengths of light are defined herein as wavelengths corresponding to electron transitions having long decay rates such that they give rise to relatively large amounts of afterglow and thereby undesirably affect measurements to be made using the scintillator. According to some embodiments of the invention, wavelengths corresponding to afterglow that undesirably affects a measurement may be reduced or eliminated by filtering.

In some applications, it may be possible to select a scintillator having short decay rates, for example by reducing the impurities and imperfections in the scintillator. However, such scintillators tend to be more difficult to manufacture and/or to select, and therefore tend to be more expensive. It is to be appreciated that according to aspects of the present invention, afterglow may be reduced by implementation of a suitable filter to reduce or eliminate afterglow, thereby resulting in reduced demands in manufacturing and selecting of scintillators.

An aspect of the present invention is directed to an apparatus, comprising a scintillator, a photodetector optically coupled to the scintillator, and a filter. The filter is operatively disposed intermediate the scintillator and the photodetector, and is adapted to selectively reduce scintillation light having relatively long wavelengths. Accordingly, in such apparatus, photons emitted by electrons having relatively long decay rates are reduced or eliminated. The phrase "optically coupled to" is defined herein to mean adapted to receive light directly or indirectly (from an indicated device) in an operative manner; and/or to transmit light directly or indirectly (to an indicated device) in an operative manner.

Figure 1:
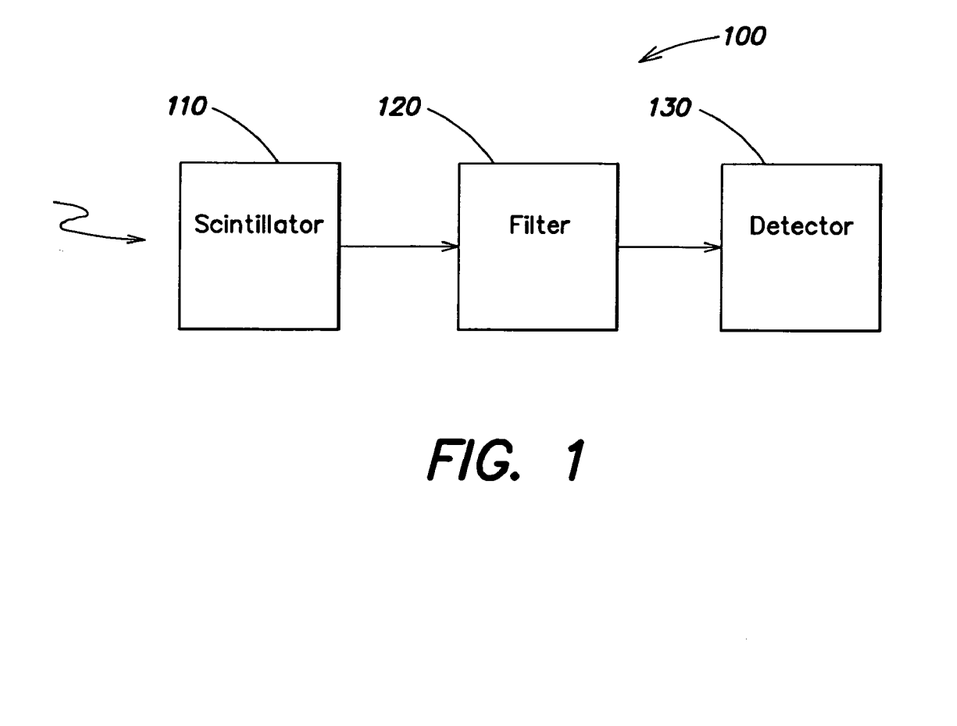
FIG. 1 is a function block diagram of an embodiment of a detector apparatus according aspects of the present invention.

FIG. 1 is a function block diagram of an embodiment of a detector apparatus 100 according aspects of the present invention. Detector apparatus 100 comprises a scintillator 110, a filter 120 and a photodetector 130. Filter 120 is disposed intermediate the scintillator and the photodetector, and adapted to selectively reduce the amount of light having relatively long wavelengths. Alternatively stated, the filter selectively transmits light having relatively short wavelengths. In some embodiments, the filter substantially eliminates light having relatively long wavelengths. In some embodiments, the filter reduces or substantially eliminates all scintillator light above a selected wavelength.

Figure 9:
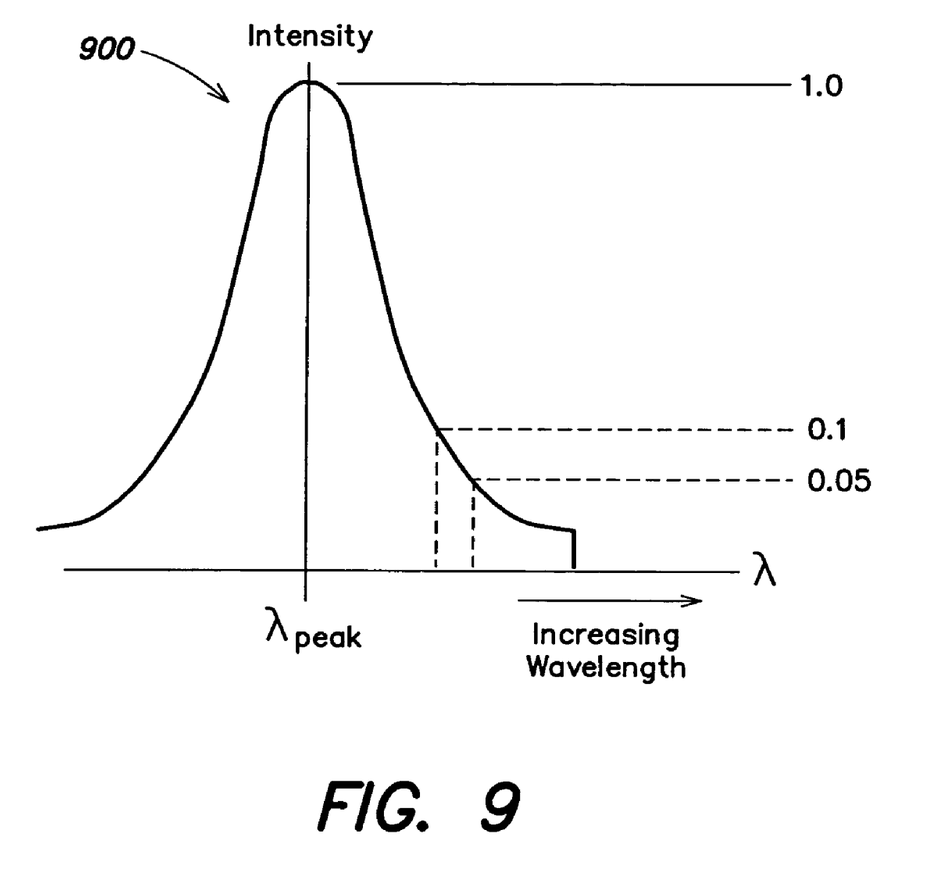
FIG. 9 is a graphical representation of a typical spectral distribution of scintillation light from a scintillator, illustrating intensity of the scintillation light as a function of wavelength $\lambda$.

As stated above, relatively long wavelengths of light are defined herein as wavelengths corresponding to electron transition having long decay rates such that they give rise to relatively large amounts of afterglow and thereby undesirably affect measurements to be made using the scintillator. In some embodiments, relatively long wavelengths of light may be defined as follows. Referring to FIG. 9, a graphical illustration of a typical spectral distribution 900 of scintillation light is presented, illustrating intensity as a function of wavelength $\lambda$. The wavelength producing maximum intensity is labeled $\lambda_{peak}$. In some embodiments, relatively long wavelengths are those wavelengths that are longer than $\lambda_{peak}$ and that produce less than 10% of intensity produced by $\lambda_{peak}$. In other embodiments, relatively long wavelengths are those that are longer than $\lambda_{peak}$ and that produce less than 5% of intensity produced by $\lambda_{peak}$. It is to be appreciated that for some scintillators the spectral distribution may be more complicated. For example, the distribution may have multiple peaks. For such scintillators, $\lambda_{peak}$ refers to the peak corresponding to maximum intensity.

Scintillator 110 may comprise any suitable material capable of scintillation. For example, as is know in the art, a scintillator may be selected according to characteristics such as absorption spectrum of radiation, emission spectra of scintillation light, decay rate of excited electrons and/or thermal sensitivity. Typically, the absorption spectra is in a high energy regime, such as ultraviolet, x-ray or gamma rays, beta particle, and/or alpha particles; and the emission spectra is in a more easily detected regime such as visible and/or infrared light. However, the invention is not so limited and scintillators for use with aspects of the present invention may have any suitable absorption spectrum and emission spectrum.

It is typically preferable that a scintillator be selected to have a short decay rate of excited electrons. However, as stated above, an aspect of the present invention is directed to the use of a filter capable of reducing the effects of excited electrons having long decay rates, by filtering scintillation light having relatively long wavelengths. Accordingly, a need to select a scintillator having a short decay rate may be reduced, thereby reducing the cost and efforts associated with providing a scintillator having short decay rates.

In some embodiments, a scintillator is selected to have a low thermal sensitivity so that characteristics of the scintillator are suitably stable in the presence of ambient heat. Commonly known examples of scintillators include crystals comprising one of cesium-iodide (CsI), cesium iodide thallium (CsI(Tl)), cesium iodide sodium (CsI(Na)), cadmium tungsten oxide ($CdWO_4$), sodium iodide thallium NaI(Tl), and barium fluoride ($BaF_2$).

Filter 120 is operatively disposed intermediate scintillator 110 and photodetector 130. The term "operatively disposed intermediate" indicates that light passes through the filter after it is emitted by the scintillator and before it is detected by the photodetector. The filter may or may not be located between the scintillator and the photodetector.

Filter 120 may be mechanically coupled to the scintillator and/or the photodetector, for example using a frame or housing. Alternatively, filter 120 may be placed in proximity to the scintillator and the photodetector using any suitable technique, such that filter is operatively disposed intermediate the scintillator and the photodetector. In some embodiments, the filter may be attached to the scintillator and/or the photodetector. For example, the filter may be attached using an adhesive such as an adhesive comprising an epoxy or silicone, or any other suitable adhesive. Such adhesives may be disposed outside of the region of optical coupling, or the filter may be optically coupled through the adhesive.

In embodiments in which the filter is optically coupled through the adhesive, the adhesive preferably is in intimate contact with the filter and the components (e.g., to avoid air pockets). In some embodiments, the adhesive is selected such that the light travels from a low index medium to a higher index medium or between two materials having indices of refraction that are similar. Accordingly, the effects of total internal reflection may be reduced or eliminated.

In embodiments in which the filter is optically coupled through the adhesive, the adhesive is selected to be at least partially transparent in the relevant band widths. In some embodiments, in which an adhesive is not used, the filter may be in direct contact with the scintillator and/or photodetector. For example, the filter may be pressed into contact with scintillator and/or photodetector.

Filter 120 may be deposited onto a surface of the scintillator and/or a surface of the photodetector to form a coating thereon. It is to be appreciated that in embodiments in which the filter is deposited on the photodetector, the material may be deposited directly on the photodector material or on a casing disposed over the photodetector material. For example, in embodiments in which photodetector 130 is a photomultiplier tube, the filter may be deposited on a glass casing of the photodetector.

As stated above, filter 120 is chosen to selectively transmit scintillation light having relatively short wavelengths, and filter out relatively long wavelengths. For reasons stated above, the filter reduces the effects of afterglow. Preferably, the selectively transmitted light corresponds to electron transitions from high energy states to low energy states having decay times that are suitably short, such that output from detector 130 of detector apparatus 100 (e.g., CT apparatus, a RG apparatus or a geophysical apparatus) is fast enough to make a selected measurement.

For example, the filter may be a dichroic filter, colored glass filter, an interference filter, or any other suitable type of filter. In some embodiments, the filter may be a high pass filter, a notch filter or bandpass filter. In some embodiments, filter 120 is comprised of a plurality of filter elements that in combination selectively transmit radiation having relatively short wavelengths, and block long relatively long wavelengths.

A filter is typically selected to provide suitable performance in combination with scintillator 110, so as to selectively transmit scintillation light having relatively short wavelengths, and filter out relatively long wavelengths. Accordingly, the filter may be selected based on characteristics of the scintillator with which it is used. For example, the scintillator characteristics may include the scintillator material, as well as characteristics such as the purity of the scintillator material, and the manufacture techniques of the scintilltor.

Figure 8A:
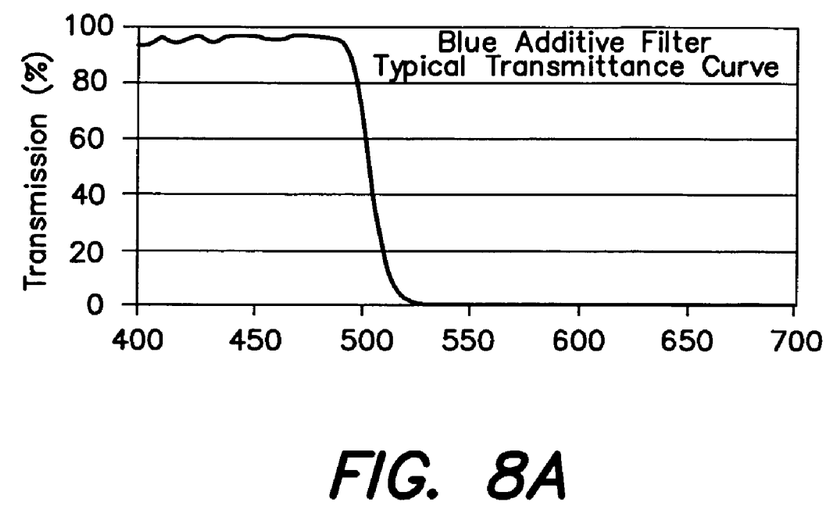
FIGS. 8A and 8B are graphical illustrations of transmission characteristics of a blue additive filter and a cyan subtractive filter suitable for use in some embodiments of the present invention.
Figure 8B:
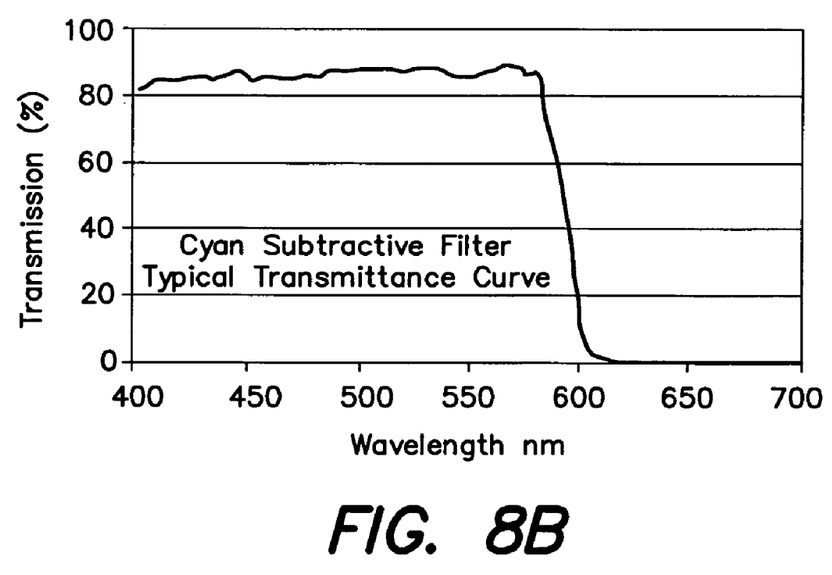

Examples of combinations of scintillator materials and filters that have been selected to provide suitable performance include a NaI(Tl) scintillator or a CsI(Na) scintillator in combination with a blue additive dichroic filter, such as model number H52-532 from Edmund Scientific; and CsI (Tl) or a CdWO$_4$ in combination with a cyan subtractive dichroic filter, such as model number H52-538 from Edmund Scientific (Barrington, N.J.). Graphical illustrations of transmission characteristics of the H52-532 filter and the H52-538 filter are depicted in FIGS. 8A and 8B, respectively.

Referring again to FIG. 1, photodetector 130 may be any suitable photodetector capable of detecting light emitted by scintillator 110. The photodetector may be selected to have suitably low noise characteristics and suitably high sensitivity to light transmitted by filter 120. For example, the photodetector may be a photodiode or a photomultiplier.

Figure 2:
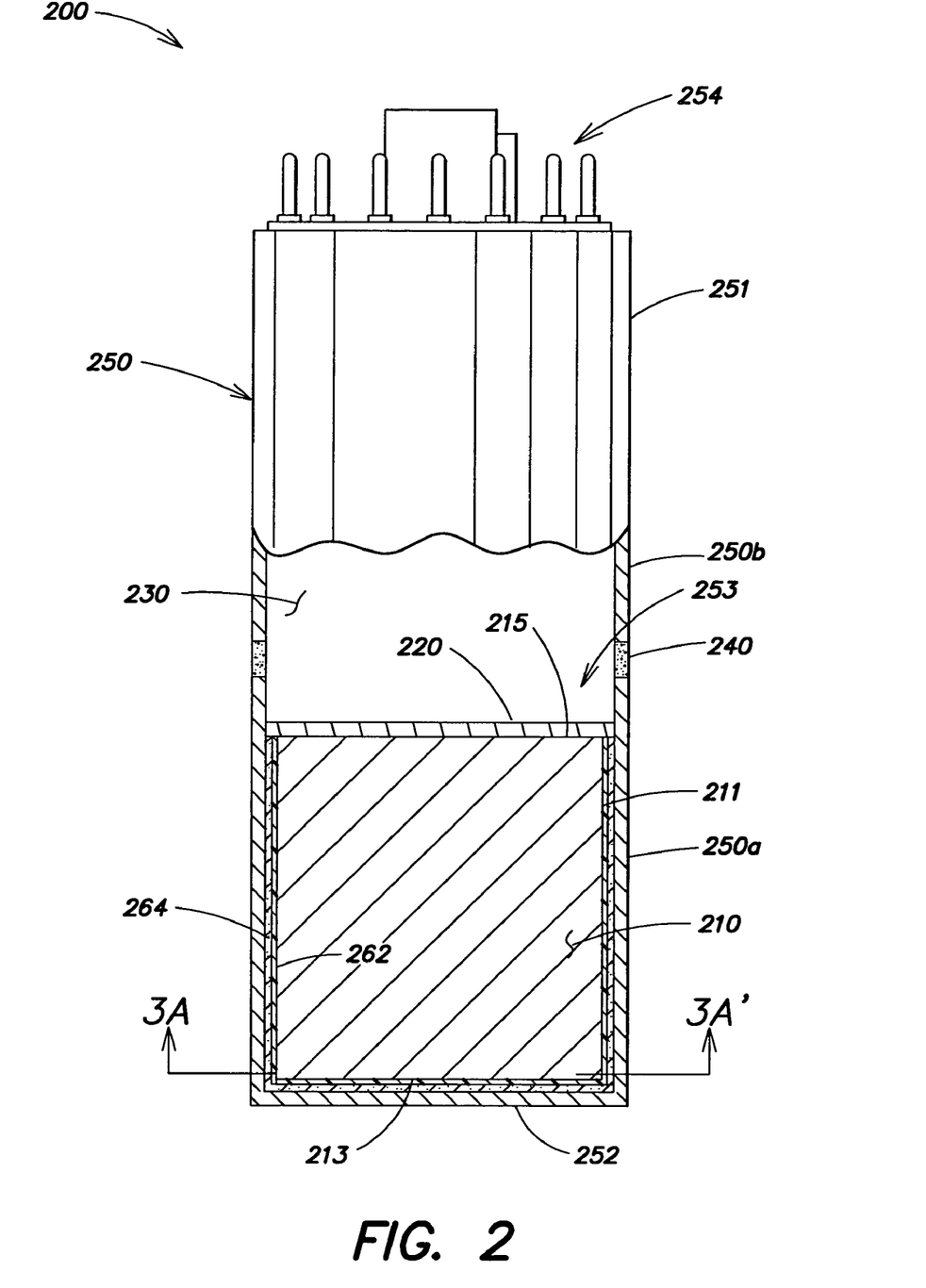
FIG. 2 is a cross sectional side view of an exemplary embodiment of a detector apparatus comprising a scintillator, filter, and a photodetector positioned within a housing.

FIG. 2 is a cross sectional, schematic side view of an exemplary embodiment of a detector apparatus comprising a scintillator 210, filter 220, and a photodetector 230 positioned within a housing 250. Housing 250 may comprise any suitable structure that permits radiation to reach the scintillator and pass through the filter to the photodetector. The housing preferably protects each component positioned therein and secures the components in suitable positions relative to one another. In some embodiments, housing 250 is comprised of a first component 250a to house the scintillator and the filter and a second component 250b to house the photodetector.

Housing component 250a comprises a hollow cylinder having a closed end 252 and an open end 253 through which the components are placed in housing component 250a. In the illustrated embodiment, scintillator 210 receives radiation through housing component 250a. Accordingly, housing component 250a is preferably selected to be substantially transparent to the radiation to be detected.

As is known in the art, each of the scintillator, filter and photodetector is suitably cleaned prior to placement in the housing. Lateral surface(s) 211 and/or anterior surface 213 of the scintillator may be located opposite a material 262 that is reflective at wavelengths of the light emitted by the scintillator in response to the radiation to be detected. Accordingly, any light exiting the scintillator from the lateral surface(s) 211 and/or anterior surface 213 is redirected back into the scintillator, such that it can only exit through the posterior surface 215. As stated above, the light is typically in the visible and/or infrared range. Therefore, in such embodiments, the reflective material is selected to have a high reflectivity in these wavelength ranges. For example, the reflector may be white material, such as a white Teflon™.

Additionally, the scintillator may be wrapped in a mechanically resilient material 264 so that the scintillator is securely maintained in the housing. The mechanically resilient material may also operate to press the reflector 262 against the scintillator. One example, of a suitable mechanically resilient material is silicon sponge.

Filter 220 is disposed in housing 250 such that it receives light from scintillator 210. As described above, in some embodiments, an adhesive may be disposed on a first surface of the filter to form a stable mechanical interface between the scintillator and filter, and an adhesive may be located on a second surface of the filter to form a stable mechanical interface between the filter and the photodetector.

In some embodiments, housing component 250a is hermetically sealed to housing component 250b. Alternatively, a housing containing filter 220 may be hermetically sealed directly to the detector. Any suitable technique of forming a hermetic seal 240 may be used. For example, the hermetic seal may be formed using an epoxy.

A shielding material may be disposed on lateral surface(s) 251 of the housing component 250b to prevent light from reaching the photodetector other than from the scintillator 210 via the filter 220. In some embodiments, the shielding material may provide magnetic shielding of the photodetector to prevent magnetic fields from interfering with the photodetector output. Housing 250 may be provided with any suitable structure 254 for receiving an output from photodetector 230.

Figure 3A:
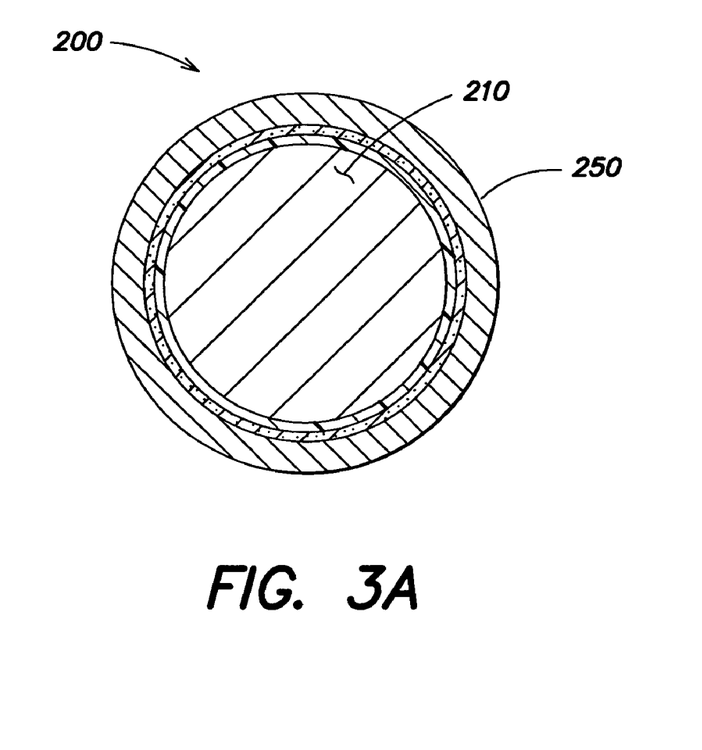
FIG. 3A is a cross sectional schematic view of the exemplary embodiment of detector apparatus of FIG. 2 taken of along line 3A—3A.
Figure 3B:
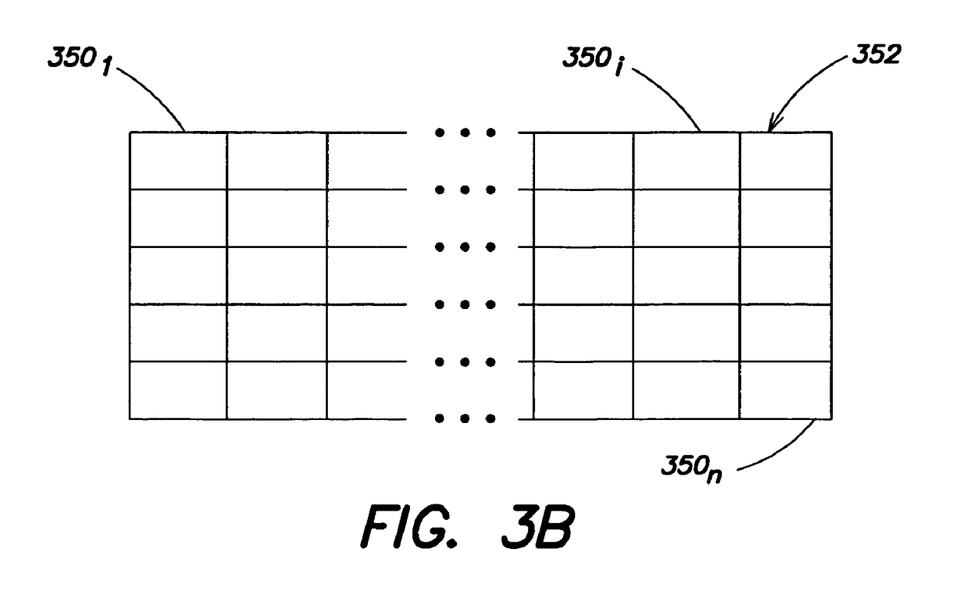
FIG. 3B illustrates an array of detector apparatus according to aspects of the present invention.

FIG. 3A is a cross sectional, schematic view of the exemplary embodiment of detector apparatus 200, taken of along line 3A—3A of FIG. 2. In the illustrated embodiment, the detector apparatus 200, housing 250 and scintillator 210 each have a circular profile. For example, such a profile may be suitable for detector apparatus comprising a PMT photodetector. However, the invention is not so limited and any suitable profile may be implemented for a detector apparatus having a PMT photodetector or any other suitable photodetector. FIG. 3B illustrates an array 352 of detector apparatus. In the illustrated embodiment of an array of detector apparatus, each detector apparatus $350_1$–$350_n$ comprising the array has a rectangular profile to provide a suitable fill factor.

The following discussion demonstrates an example of reduction of afterglow using a filter to reduce relatively long wavelengths of scintillator light. The experimental arrangement used to capture data according to the example was configured as follows. A $Cs^{137}$ source producing 662 keV photons projected radiation onto a scintillator. The scintillator was a 3-inch diameter by 0.5-inch thick CsI(Na) scintillator masked using an aluminum foil to form a window approximately 2-inch by 2-inch in area. A 2-inch by 2-inch blue additive filter was optically coupled to the window in the scintillator. The anterior and lateral surfaces of the scintillator were placed opposite a white Teflon reflector.

Figure 4A:
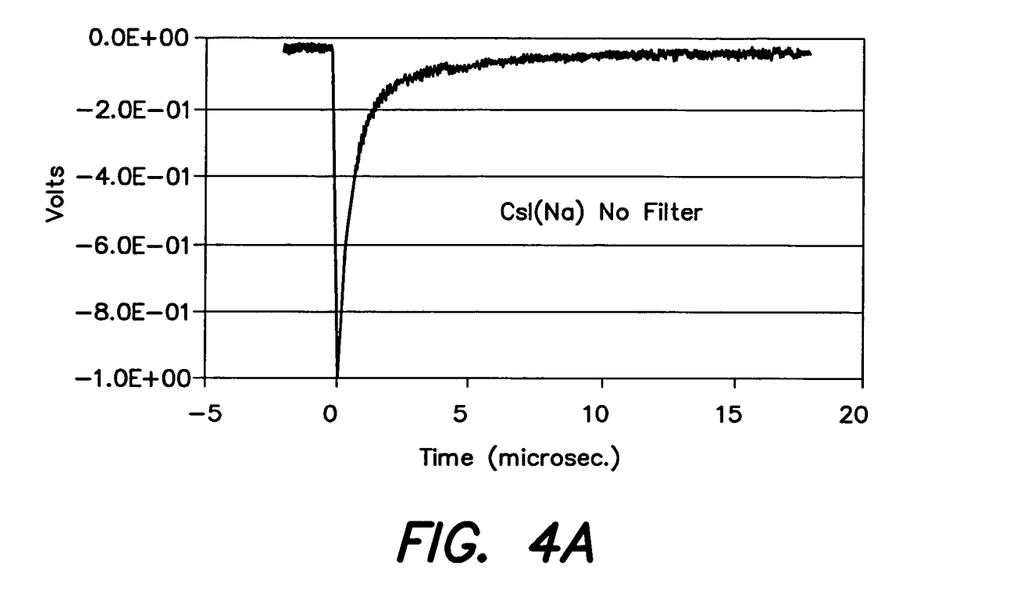
FIG. 4A illustrates an oscilloscope output corresponding to 32 averaged outputs of a detector apparatus with no filter in place.
Figure 4B:
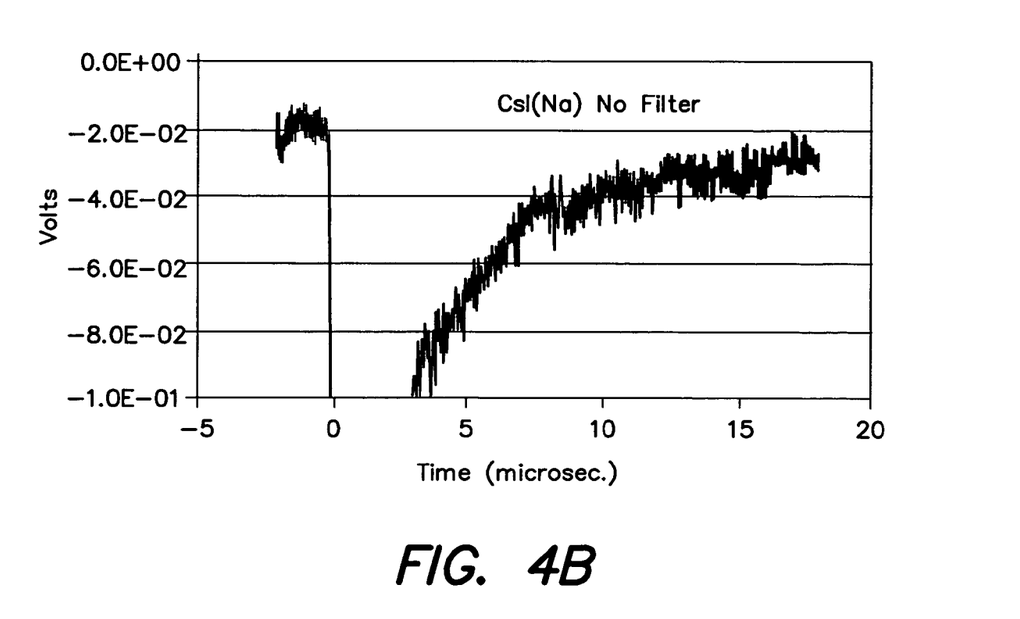
FIG. 4B is an amplified view of the trace of FIG. 4A.

A photomultiplier tube (PMT) large enough to receive light from the 2-inch by 2-inch window was optically coupled to the window in the scintillator through the filter. The PMT was biased to 1000 Volts. Exemplary outputs of the PMT were measured on a digitizing oscilloscope and are illustrated in the traces of FIGS. 4A–4B (without a filter) and FIGS. 5A–5B (with a filter). Each trace illustrates an 18 microsecond window after the pulse of radiation. A two microseconds period prior to the 18 microsecond window is a baseline period occurring prior to the scintillator being excited by a radiation source at time 0 microseconds.

Four sets of outputs, each corresponding to an average of 32 excitation pulses, were obtained with no filter in place. Each of the 32 pulses consisted of a single photon from the radiation source. FIG. 4A illustrates one of the four outputs, as measured by an oscilloscope. FIG. 4B is an amplified view of the trace of FIG. 4A. FIG. 4A illustrates a trace representing an average of 32 pulse responses with no filter in place. In FIG. 4A, the peak output at time zero is normalized to minus 1 Volt.

Figure 5A:
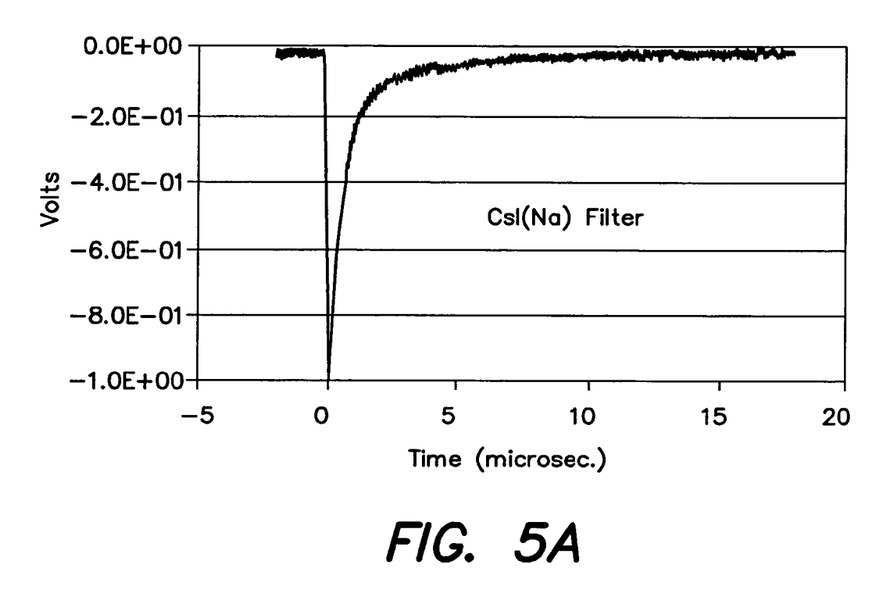
FIG. 5A illustrates an oscilloscope output corresponding to 32 averaged outputs of a detector apparatus with a blue additive filter in place.
Figure 5B:
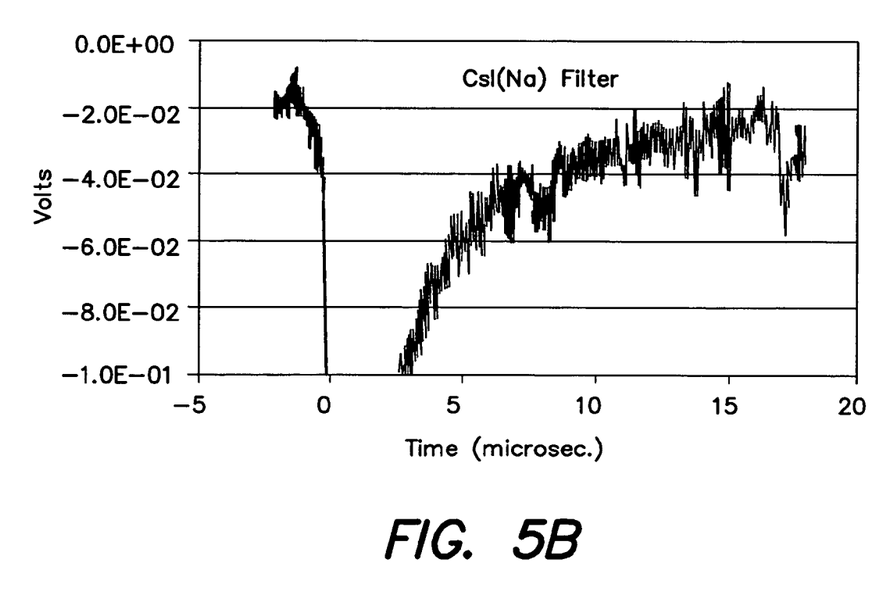
FIG. 5B is an amplified view of the trace of FIG. 5A.

Subsequently, four sets of outputs, each output corresponding to an average of 32 pulses, were obtained with a blue additive filter operatively disposed intermediate the scintillator and the photodetector of the above experimental arrangement. FIG. 5A illustrates a trace representing an average of 32 pulse responses with the blue additive filter in place. FIG. 5B is an amplified view of the trace of FIG. 5A. The oscilloscope output was re-normalized such that the peak at 0 microseconds was again equal to a value of minus 1 Volt. The re-normalization accounts for the reduction in signal strength which results from losses due to the addition of the filter.

By comparing the four outputs without the filter and for the four outputs with the filter, an average reduction in the area under the curves in the region from 13–16 microseconds was determined to be approximately 20%. Accordingly, the experimental apparatus demonstrates an example of afterglow being reduced by reducing relatively long wavelengths of scintillator light.

Figure 6:
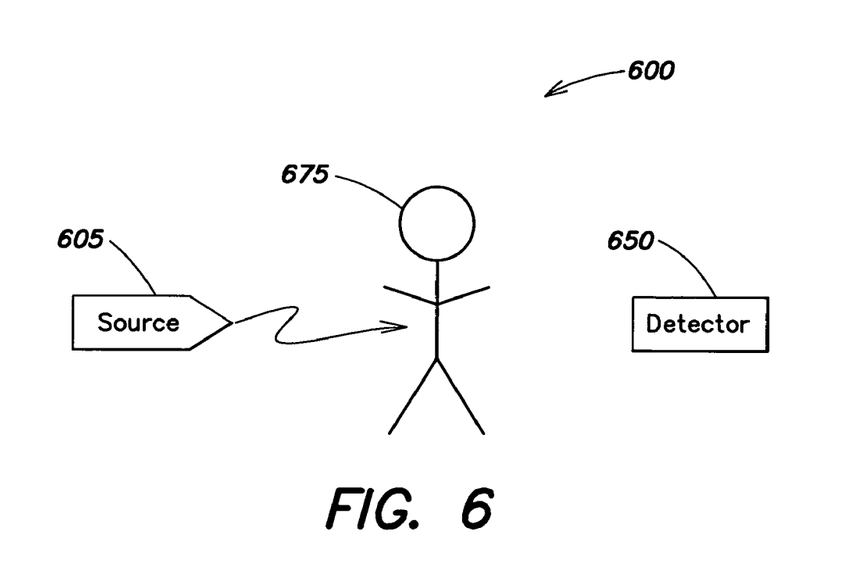
FIG. 6 is a schematic illustration of a scintillation system implementing a detector apparatus according to aspects of the present invention.

FIG. 6 is a schematic illustration of a scintillation system 600 implementing a detector apparatus 650 according to aspects of the present invention. The scintillation system comprises a source of excitatory radiation 605. System 650 may be suitable for use with an animate object 675, such as a human being, or an inanimate object. For example, the system may be a geophysical measurement apparatus, an RG apparatus or a CT apparatus. System 600 may be configured as any conventional scintillation system except for the use of a detector apparatus 650 including a filter disposed intermediate a scintillator and a photodetector. Detector apparatus 650 may be any suitable detector apparatus including a filter operatively disposed between a scintillator and a photodetector as described herein above.

Figure 7A:
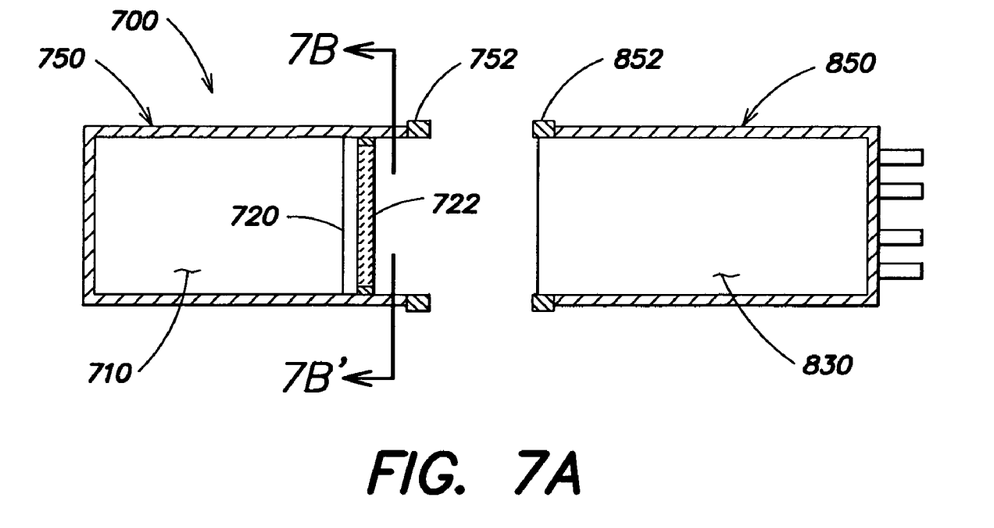
FIG. 7A is a schematic illustration of an apparatus comprising a scintillator and a filter, and adapted to couple to a photodetector, such that the filter is operatively disposed intermediate the scintillator and the photodetector.

FIG. 7A is a schematic illustration of an apparatus 700 comprising scintillator 710 and filter 720, and adapted to couple to a photodetector, such that the filter is operatively disposed intermediate the scintillator and the photodetector. As discussed above with reference to FIG. 2, the scintillator and the filter may be located in a housing 750 that is adapted to connect to a housing 850 having a photodetector 830 located therein. Housings 750 and 850 are appropriately sized to connect to one another. Any suitable technique for connecting housing 750 and the housing 850 may be used. For example, the housings may be connected using an adhesive such as epoxy. Optionally, housings 750 and 850 may comprise connectors 752 and 852, respectively. The connectors may, for example, be threads, snap-fittings, or press-fittings. Although the above embodiment of an apparatus 700 comprising scintillator 710 and filter 720, and adapted to couple to a photodetector was discussed with reference to a photodetector 830 located within a housing 850, in some embodiments, photodetector 830 is not located in a housing. As such, housing 750 may be coupled to the photodetector in any suitable fashion.

Filter 720 is suitably sized to couple to the scintillator 710 and detector 830. For example, the filter may have a size and shape such that at least some of the light that reaches the photodetector from the scintillator passes through the filter. In some embodiments, all the light that reaches the photodetector from the scintillator passes through the filter. Filter 720 may be attached to housing 750 using any suitable technique. Filter 720 may be directly connected to housing 750. In some embodiments, it may be advantageous to locate filter 720 on a suitably transparent mount 722, such as a glass substrate. Filter 720 may be attached to mount 722 using any suitable technique, such as using a transparent silicone or epoxy.

Figure 7B:
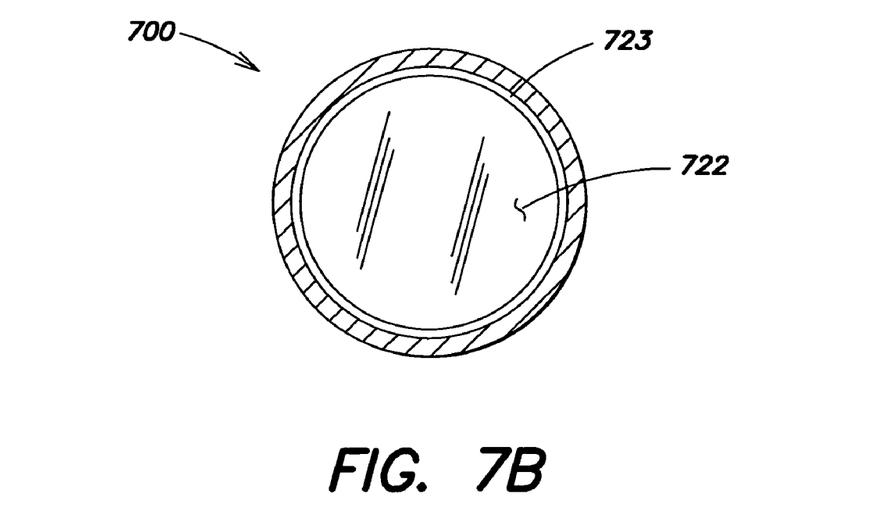
FIG. 7B is a side view of the apparatus of FIG. 7A taken along line 7B—7B.

FIG. 7B is a view of apparatus 700 taken along line 7B–7B' of FIG. 7A. Mount 722 may be connected to housing 750 (illustrated in FIG. 7A) using any suitable technique. In the illustrated embodiment, mount 722 is metalized along sides 723 so that it can be soldered to the housing.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus, comprising:
    a scintillator comprised of a material selected from the group consisting of CsI, CsI(Tl), CsI(Na), CdWO$_4$ and BaF$_2$;
    a photodetector optically coupled to the scintillator; and
    a filter comprising a blue additive dichroic filter, and operatively disposed intermediate the scintillator and the photodetector.

2. The apparatus of claim 1, wherein the filter is attached by an adhesive to at least one of the scintillator and the photodetector.

3. The apparatus of claim 2, wherein the adhesive is comprised of one of a silicone and an epoxy.

4. The apparatus of claim 3, wherein the photodetector and the scintillator are optically coupled through the adhesive.

5. The apparatus of claim 1, wherein the filter is disposed in a housing.

6. The apparatus of claim 5, wherein the filter is disposed in a first housing component and the photodetector is disposed in a second housing component, the first housing component and the second housing component being coupled together.

7. The apparatus of claim 1, wherein the scintillator is comprised of a cyan subtractive dichroic filter.

8. The apparatus of claim 1, wherein the filter is mechanically coupled to at least one of the scintillator and the photodetector.

9. The apparatus of claim 1, wherein the filter is attached to at least one of the scintillator and the photodetector.

10. The apparatus of claim 1, wherein the filter is a coating disposed on one of the photodetector and the scintillator.

11. The apparatus of claim 1, wherein the photodetector comprises a casing and the filter is disposed on the casing.

12. The apparatus of claim 1, wherein the filter comprises at least one of a high pass filter, a notch filter and a bandpass filter.

13. The apparatus of claim 1, wherein the photodetector comprises one of a photodiode and a photomultiplier tube.

14. The apparatus of claim 1, wherein the relatively long wavelengths comprise wavelengths of scintillation light from the scintillator that produce less than 10% of the intensity that the wavelength of maximum intensity ($\lambda_{peak}$) produces.

15. The apparatus of claim 1, wherein the relatively long wavelengths comprise wavelengths of scintillation light from the scintillator that produce less than 5% of the intensity that the wavelength of maximum intensity ($\lambda_{peak}$) produces.

16. A filter adapted to selectively reduce light having relatively long wavelengths, and constructed and arranged to be operatively disposed intermediate a scintillator and a photodetector wherein the light having relatively long wavelengths comprise wavelengths of scintillation light from the scintillator that produce less than 10% of the intensity that the wavelength of maximum intensity ($\lambda_{peak}$) produces.

17. The filter of claim 16, wherein the filter is disposed on a substrate.

18. The filter of claim 17, wherein the scintillator is disposed in a housing, and the substrate is adapted to be connected to the housing.

19. The filter of claim 18 wherein the substrate is metalized along its lateral sides.

20. The filter of claim 16, wherein the filter is constructed and arranged such that all the light that reaches the photodetector from the scintillator passes through the filter.

21. The filter of claim 16, wherein the relatively long wavelengths comprise wavelengths of scintillation light from the scintillator that produce less than 5% of the intensity that the wavelength of maximum intensity ($\lambda_{peak}$) produces.

22. The filter of claim 16, wherein the filter is one of a dichroic filter, a colored glass filter, and an interference filter.

23. The filter of claim 16, wherein the filter comprises at least one of a high pass filter, a notch filter, and a bandpass filter.

24. A method of detecting radiation, comprising:
projecting radiation onto a scintillator to produce scintillation light;
selectively reducing wavelengths of scintillation light from the scintillator that produce less than 10% of the intensity that scintillation light having a wavelength of maximum intensity ($\lambda_{peak}$) produces; and
detecting the scintillation light.

25. The method of claim 24, wherein selectively reducing a portion of the scintillation light comprises filtering the light using one of a dichroic filter, a colored glass filter and an interference filter.

26. The method of claim 24, wherein selectively reducing a portion of the scintillation light comprises filtering the light using at least one of a high pass filter, a notch filter and a bandpass filter.

27. The method of claim 24, wherein the step of selectively reducing comprises selectively reducing wavelengths of scintillation light from the scintillator that produce less than 5% of the intensity that the wavelength of maximum intensity ($\lambda_{peak}$) produces.

28. A method of facilitating radiation detection, comprising:
providing a filter constructed and arranged to selectively reduce light emitted by the scintillator having relatively long wavelengths, and
positioning the filter in a location to receive light from the scintillator;
wherein the filter selectively reduces wavelengths of scintillation light from the scintillator that produce less than 10% of the intensity that the wavelength of maximum intensity ($\lambda_{peak}$) produces.

29. The method of claim 28, wherein the filter is one of a dichroic filter, a colored glass filter and an interference filter.

30. The method of claim 28, wherein the filter comprises at least one of a high pass filter, a notch filter and a bandpass filter.

31. The method of claim 28, wherein the step of selectively reducing comprises selectively reducing wavelengths of scintillation light from the scintillator that produce less than 5% of the intensity that the wavelength of maximum intensity ($\lambda_{peak}$) produces.

32. An apparatus for use with a photodetector, comprising:
a scintillator
a filter comprised of one of a blue additive dichroic filter and a cyan subtractive dichroic filter; and
a structure configured to maintain the scintillator and the filter, the structure being adapted to couple to a photodetector such that the filter is operatively disposed intermediate the scintillator and the photodetector.

33. The apparatus of claim 32, wherein the filter is attached by an adhesive to the scintillator.

34. The apparatus of claim 33, wherein the adhesive is comprised of one of a silicone and an epoxy.

35. The apparatus of claim 34, wherein the filter and the scintillator are optically coupled through the adhesive.

36. The apparatus in claim 32, wherein the scintillator is comprised of a material selected from the group consisting of CsI, CsI(Tl), CsI(Na), $CdWO_4$, and $BaF_2$.

37. The apparatus of claim 36, wherein the filter is comprised of a blue additive dichroic filter.

38. The apparatus of claim 36, wherein the filter is comprised of a cyan subtractive dichroic filter.

39. The apparatus of claim 32, wherein the structure is comprised of a housing.

40. The apparatus of claim 39, wherein the filter is disposed in a first housing component adapted to connect to a second housing component in which the photodetector is disposed.

41. The apparatus of claim 32, wherein the filter is attached to the scintillator.

42. The apparatus of claim 32, wherein the filter is a coating disposed on the scintillator.

43. The apparatus of claim 32, wherein the filter comprises at least one of a high pass filter, a notch filter and a bandpass filter.

44. The apparatus of claim 32, wherein the relatively long wavelengths comprise wavelengths of scintillation light from the scintillator that produce less than 10% of the intensity that the wavelength of maximum intensity ($\lambda_{peak}$) produces.

45. The apparatus of claim 32, wherein the relatively long wavelengths comprise wavelengths of scintillation light from the scintillator that produce less than 5% of the intensity that the wavelength of maximum intensity ($\lambda_{peak}$) produces.

46. A scintillator system, comprising:
a radiation source;
a scintillator optically coupled to receive radiation from the radiation source;
a photodetector optically coupled to receive scintillation light from the scintillator;
a filter operatively disposed intermediate the scintillator and the photodetector and adapted to selectively reduce scintillator light having relatively long wavelengths,
wherein the relatively lone wavelengths comprise wavelengths of scintillation light from the scintillator that produce less than 10% of the intensity that the wavelength of maximum intensity ($\lambda_{peak}$) produces.

47. The scintillator system of claim 46, wherein the filter is mechanically coupled to at least one of the scintillator and the photodetector.

48. The scintillator system of claim 47, wherein the filter is disposed in a housing.

49. The scintillator system of claim 48, wherein the filter is disposed in a first housing component and the photodetector is disposed in a second housing component, the first housing and the second housing component being coupled together.

50. The scintillator system of claim 46, wherein the filter is attached by an adhesive to at least one of the scintillator and the photodetector.

51. The scintillator system of claim 50, wherein the adhesive is one of a silicone adhesive and an epoxy.

52. The scintillator system of claim 51, wherein the photodetector and the scintillator are optically coupled through the adhesive.

53. The scintillator system in claim 46, wherein the scintillator is comprised of a material selected from the group consisting of CsI, CsI(Tl), CsI(Na), $CdWO_4$ and $BsF_2$.

54. The scintillator system of claim 53, wherein the filter is comprised of a blue additive dichroic filter.

55. he scintillator system of claim 53, wherein the filter is comprised of a cyan subtractive dichroic filter.

56. The scintillator system of claim 46, wherein the filter is a coating disposed on one of the photodetector and the scintillator.

57. The scintillator system of claim 56, wherein the photodetector comprises a casing and the filter is deposited on the casing.

58. The scintillator system of claim 46, wherein the filter is attached to at least one of the scintillator and the photodetector.

59. The scintillator system of claim 46, wherein the filter is one of a dichroic filter, a colored glass filter and an interference filter.

60. The scintillator system of claim 46, wherein the filter comprises at least one of a high pass filter, a notch filter and a bandpass filter.

61. The scintillator system of claim 46, wherein the photodetector comprises one of a photodiode and a photomultiplier tube.

62. The scintillator system of claim 46, wherein the scintillator system is one of a CT system and an RG system.

63. The scintillator system of claim 46, wherein the relatively long wavelengths comprise wavelengths of scintillation light from the scintillator that produce less than 5% of the intensity that the wavelength of maximum intensity ($\lambda_{peak}$) produces.

64. An apparatus, comprising:

a scintillator having a cyan subtractive dichroic filter and comprised of a material selected from the group consisting of CsI, CsI(Tl), CsI(Na), $CdWO_4$, and $BaF_2$; and a photodetector optically coupled to the scintillator.

* * * * *